(12) United States Patent
Remboski et al.

(10) Patent No.: US 11,472,226 B2
(45) Date of Patent: Oct. 18, 2022

(54) LUBRICANT SUPPORTED ELECTRIC MOTOR WITH WHEEL SUPPORT

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

( * ) Notice: Subject to any disclaimer, the term of this patent is extended or adjusted under 35 U.S.C. 154(b) by 334 days.

(21) Appl. No.: 16/668,390

(22) Filed: Oct. 30, 2019

(65) Prior Publication Data
US 2020/0130408 A1 Apr. 30, 2020

Related U.S. Application Data

(60) Provisional application No. 62/752,442, filed on Oct. 30, 2018.

(51) Int. Cl.
*B60K 7/00* (2006.01)
*H02K 7/00* (2006.01)
*B60B 7/06* (2006.01)
*F16H 57/04* (2010.01)

(52) U.S. Cl.
CPC ............ *B60B 7/063* (2013.01); *B60K 7/0007* (2013.01); *F16H 57/0476* (2013.01); *H02K 7/006* (2013.01)

(58) Field of Classification Search
CPC ... B60B 7/063; B60B 7/0007; F16H 57/0476; H02K 7/006; H02K 14/088; H02K 5/165; H02K 5/1677; H02K 2201/03
See application file for complete search history.

(56) References Cited

U.S. PATENT DOCUMENTS

| 2,983,832 | A | * | 5/1961 | Elmer | .................. H02K 5/1675 310/90 |
| 3,196,301 | A | * | 7/1965 | Turk | ..................... H02K 5/1675 310/90 |
| 4,382,199 | A | * | 5/1983 | Isaacson | ................ H02K 7/088 310/90 |

(Continued)

FOREIGN PATENT DOCUMENTS

| CN | 102673380 A | 9/2012 | |
| CN | 108725683 A | * 11/2018 | ........... B60B 27/023 |

(Continued)

*Primary Examiner* — Steve Clemmons
(74) *Attorney, Agent, or Firm* — Dickinson Wright PLLC

(57) ABSTRACT

A lubricant supported electric motor includes a stator extending along an axis, and a rotor rotatably disposed around the stator in radially surrounding and spaced relationship to define at least one support chamber. A lubricant is disposed in the support chamber for supporting the rotor around the stator. A wheel rim is fixedly attached to the rotor and is disposed in surrounding relationship with the rotor and the stator. Thus, in a first aspect, rotation of the rotor is directly transferred to the wheel rim such that the wheel rim rotates in accordance with the rotation of the rotor. In accordance with another aspect, the rotor is rotatably disposed within the stator, and a planetary gear reduction mechanism is operably interconnected to the rotor, the stator, and the wheel rim and configured to rotate the wheel rim in response to rotation of the rotor within the stator.

6 Claims, 2 Drawing Sheets

(56) References Cited

U.S. PATENT DOCUMENTS

| | | | |
|---|---|---|---|
| 4,799,564 A | | 1/1989 | Iijima et al. |
| 5,442,250 A | | 8/1995 | Stridsberg |
| 5,939,813 A | * | 8/1999 | Schob .................. F16C 32/047 |
| | | | 310/90 |
| 6,355,996 B1 | * | 3/2002 | Birkestrand ........... B62K 23/04 |
| | | | 180/65.6 |
| 10,404,135 B2 | * | 9/2019 | Rubin ..................... H02K 21/14 |
| 10,424,992 B2 | * | 9/2019 | Bruckhoff .............. H02K 7/086 |
| 2008/0296121 A1 | | 12/2008 | Miyazaki et al. |
| 2010/0140020 A1 | | 6/2010 | Murahashi |
| 2016/0172931 A1 | * | 6/2016 | Teets .................... H02K 5/1677 |
| | | | 310/90 |
| 2022/0048381 A1 | * | 2/2022 | Wangenborn ........ B60K 7/0007 |

FOREIGN PATENT DOCUMENTS

| | | | |
|---|---|---|---|
| DE | 102015207778 A1 * | 11/2016 | |
| DE | 102015207778 A1 | 11/2016 | |
| EP | 1238213 B1 * | 6/2003 | ......... F16H 57/0427 |

* cited by examiner

LUBRICANT SUPPORTED ELECTRIC MOTOR WITH WHEEL SUPPORT

CROSS REFERENCE TO RELATED APPLICATION

The subject application claims priority to U.S. Provisional Application Ser. No. 62/752,442 filed on Oct. 30, 2018, the entire disclosure of which is hereby incorporated by reference.

FIELD OF THE DISCLOSURE

The present disclosure relates generally to a lubricant supported electric motor. More specifically, the present disclosure relates to a lubricant supported electric motor with an integrated wheel support.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations are one alternative arrangement for the traditional ICE prime mover that distributes the prime mover function to each or some of the plurality of wheels via one or more motors disposed on, within, or proximate to the plurality of wheels. For example, in one instance, a traction motor, using a central shaft though a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, can be utilized as the "on wheel", "in wheel" or "near wheel" motor configuration. While each of these motor configurations result in a smaller size and lighter weight arrangement as compared to the prime movers based on the internal combustion engine, they each have certain drawbacks and disadvantages.

For example, the utilization of traction motors as the "on wheel", "in wheel" or "near wheel" configuration still results in motors that are too heavy and not robust enough to shock loading to be useful for wheel-end applications. In other words, present traction motors are large, heavy structures supported by rolling element bearings, which are too heavy and large to be practical for wheel end applications.

SUMMARY OF THE INVENTION

In accordance with one aspect, the subject invention is directed to a lubricant supported electric motor including a stator extending along an axis, and a rotor extending along the axis and rotatably disposed around the stator in radially surrounding and spaced relationship to define at least one support chamber extending between the stator and the rotor. A lubricant is disposed in the at least one support chamber for supporting the rotor around the stator. A wheel rim is fixedly attached to the rotor and is disposed in surrounding relationship with the rotor and the stator. Thus, in this aspect, rotation of the rotor is directly transferred to the wheel rim such that the wheel rim rotates in accordance with the rotation of the rotor. In other words, the rotor of the lubricant supported electric motor directly supports a driven wheel.

In accordance with another aspect, the subject invention is directed to a lubricant supported electric motor includes a stator extending along an axis, and a rotor extending along the axis and rotatably disposed radially within the stator in spaced relationship to define at least one support chamber extending between the stator and rotor. A lubricant is disposed in the at least one support chamber for supporting the rotor within the stator. A wheel rim is disposed in radially surrounding relationship with the stator and the rotor, and a planetary gear reduction mechanism is operably interconnected to the rotor, the stator, and the wheel rim and configured to rotate the wheel rim in response to rotation of the rotor within the stator.

The lubricant supported electric motor in either of these aspects is light and small, and thus contributes to the overall design strategy for eliminating weight and size from automobiles and land vehicles. Other advantages will be appreciated in view of the following more detailed description of the subject invention.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Example embodiments of a lubricant supported electric motor with integrated wheel support will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
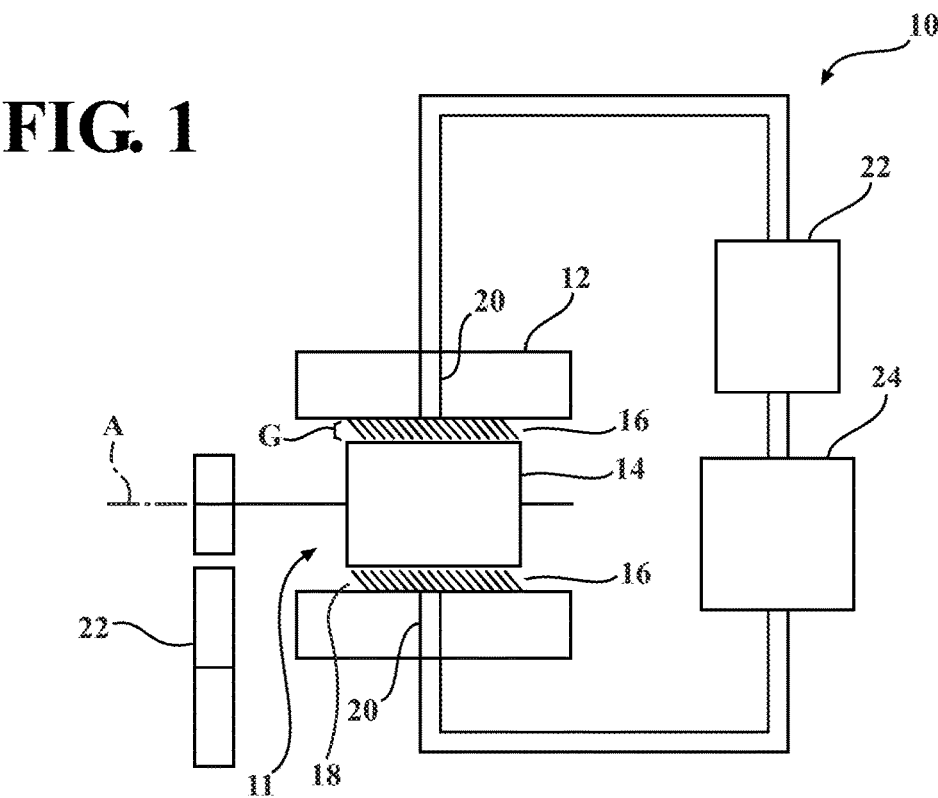
FIG. 1 is a schematic view of a lubricant supported electric motor according to the subject disclosure.

FIG. 1 illustrates a lubricant supported electric motor 10 in accordance with an aspect of the disclosure. As best illustrated in FIG. 1, the lubricant supported electric motor 10 includes a stator 12 and a rotor 14 extending along an axis A and movably disposed within the stator 12 to define a support chamber or gap 16 therebetween. A lubricant 18 is disposed in the gap 16 for supporting the rotor 14 within the stator 12, and providing continuous contact between these components. The lubricant 18 may therefore act as a buffer (e.g., suspension) between the rotor 14 and stator 12 minimizing or preventing contact therebetween. In other words, the lubricant 18 prevents direct contact between the stator 12 and rotor 14 and provides an electric lubricant supported motor 10 which is robust to shock and vibration loading due to the presence of the lubricant 18. Additionally, and alternatively, a substantially incompressible lubricant 18 may be used in order to minimize the gap between the stator 12 and rotor 14.

As further illustrated FIG. 1, the stator 12 defines a passageway 20 disposed in fluid communication with the gap 16 for introducing the lubricant 18. However, the passageway 20 could be provided on any other components of the lubricant supported electric motor 10 without departing from the subject disclosure. According to an aspect, the lubricant 18 may be cycled or pumped through the passageway 20 and into the gap 16 in various ways. For example, a high pressure source (e.g., a pump) 22 of the lubricant 18 may be fluidly coupled to a low pressure source (e.g., a sump) 24 of the lubricant 18, where the lubricant may move from the high pressure source to the lower pressure source, through the passageway 20 and into the gap 16. Rotation of the rotor 14 relative to the stator 12 may operate as a self-pump to drive lubricant 18 through the passageway 20 and into the gap 16.

As further illustrated in FIG. 1, the rotor 14 is interconnected to a drive assembly 22 for coupling the lubricant supported electric motor 10 to one of the plurality of wheels of a vehicle. For example, in one instance, the drive assembly 22 may include a planetary gear system. Alternatively, the drive assembly 22 may include one or more parallel axis gears. The stator 12 and rotor 14 are configured to exert an electromagnetic force therebetween to convert electrical energy into mechanical energy, moving the rotor 14 and ultimately driving the wheel coupled to the lubricant supported electric motor 10 via the drive assembly 22. The drive assemblies 22 may provide one or more reduction ratios between the lubricant supported electric motor 10 and the wheel in response to movement of the rotor 14.

The above described aspect of the disclosure illustrated in FIG. 1 is directed to the illustrated embodiment in which the stator 12 surrounds the rotor 14. However, the general operation of the lubricant 18 and the relationship between the stator 12 and the rotor 14 may be used in alternative arrangements of the rotor 14 and stator 12, such as the rotor 14 being disposed radially outward from the stator 12, as further described below. In such instances, the wheel structure may be supported by the rotor 14, rather than the rotor 14 being connected to a drive assembly that drives the wheel.

Figure 2:
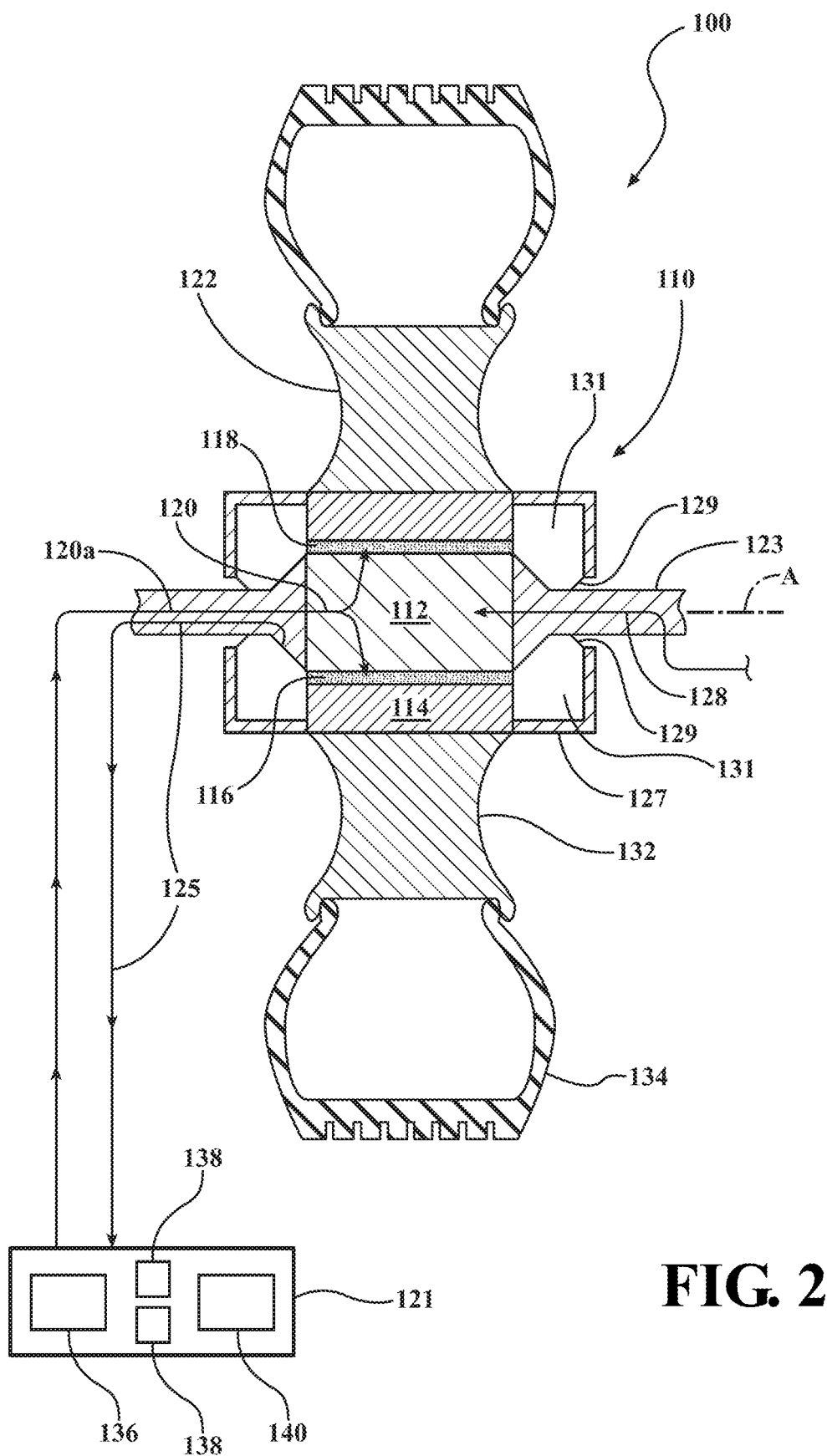
FIG. 2 is a cross-sectional view of a first aspect of the lubricant supported electric motor illustrating a directly supported wheel.

With reference to FIG. 2, a wheel end electric motor system 100 of another aspect of the disclosure is provided. The system 100 may include a wheel directly supported on a lubricant supported electric motor 110. This configuration may be desirable for single-track vehicles, such as scooters, where strong overturning moments on the wheel are reduced or non-existent.

The system 110 may include a stator 112 and a rotor 114 extending along an axis A movably disposed around the stator 112 to define a gap or support chamber 116 disposed therebetween. A lubricant 118 is disposed in the gap 116 for supporting the rotor 114 around the stator 112, and providing continuous contact between these components. The lubricant 118 may therefore act as a buffer (e.g., suspension) between the rotor 114 and stator 112 minimizing or preventing contact therebetween. In other words, the lubricant 118 prevents direct contact between the stator 112 and the rotor 114 and provides an electric lubricant supported motor 110 which is robust to shock and vibration loading due to the presence of the lubricant 118. Additionally, and alternatively, a substantially incompressible lubricant 118 may be used in order to minimize the gap between the stator 112 and the rotor 114.

As further illustrated FIG. 2, the stator 112 defines a passageway 120 disposed in fluid communication with the gap 116 for introducing the lubricant 118. However, the passageway 120 could be provided on any other components of the lubricant supported electric motor 110 without departing from the subject disclosure. According to an aspect, the lubricant 118 may be cycled or pumped through the passageway 120 and into the gap 116 in various ways. For example, a high pressure source 121 (e.g., a pump) of the lubricant 118 may be fluidly coupled to a low pressure source (e.g., a sump, not shown) of the lubricant 118, where the lubricant may move from the high pressure source to the lower pressure source, through the passageway 120 and into the gap 116. Rotation of the rotor 114 relative to the stator 112 may operate as a self-pump to drive lubricant 118 through the passageway 120 and into the gap 116.

The stator 112 may be attached to or integrated with an axle 123 that extends coaxially with the axis A. The axle 123 may provide a channel 120a through which the lubricant 118 may pass between the pump 121 and the passageway 120 of the stator 112 that provides the lubricant 118 to the gap 116. The axle 123 may further define an outlet 125 in fluid communication with the gap 116. During operation of the motor 110, the lubricant 118 may be drained from the gap 116 and directed back toward the pump 121, with fresh lubricant 118 replacing the used lubricant 118. Accordingly, the lubricant 118 may be cycled through the motor 110.

The lubricant supported electric motor 110 may further include a housing or casing 127 that surrounds the stator 112. The casing 127 may be attached to the rotor 114, and may therefore rotate along with the rotor 114 during operation of the motor 110. The casing 127 may further include a seal portion 129 that interfaces with the axle 123 and/or stator 112. The casing 127 therefore defines an internal cavity 131, which is disposed in fluid communication with and may include the gap 116. The gap 116 generally refers to the area radially between the rotor 114 and stator 112, but the gap 116 is in fluid communication with the remainder of the cavity 131, and lubricant in the gap 116 may flow freely into the remainder of the cavity 131. The above described outlet 125 may intersect the cavity 131 at a location axially outward from the gap 116. As the rotor 114 rotates and the casing 127 rotates, the seal portion 129 will generally bear against axle 123 and/or stator 112, while retaining the lubricant 118 within the cavity 131, such that the lubricant 118 will be limited to exiting the cavity via the outlet 125.

The axle 123 is preferably connected to the vehicle suspension or chassis (not shown), and does not rotate. The axle 123 may include wiring channels or passageways 128 for receiving and routing wiring or the like that may transfer current to the stator 112. The stator 112 includes windings or the like that receive a current for creating the electrical field that drives the rotor 114. The current supplied to the stator 112 may be a phase current.

In the system 100 of FIG. 2, the rotor 114 is rotationally fixed to a wheel 122. The wheel 122 may be in the form of a wheel rim 132 with an attached tire 134, or the wheel 122 may include an outer surface designed to directly bear against a ground surface. The rotor 114 may be directly attached to the wheel 122, or the rotor 114 may be fixedly attached to the wheel 122 via intermediate structure. In the system of FIG. 2, the rotor 114 and wheel 122 are directly attached, permitting direct-drive of the wheel 122 from the motor 110.

Optionally, the system 110 may include a suspension element disposed radially between the rotor 114 and the wheel 122 to provide a damping feature. This suspension material may be in the form of a compliant wheel structure, and allow the wheel 122 to shift radially relative to the rotor 114, which acts as a hub. This additional damping material may allow for the system 100 to be used in various vehicles, such as electric bikes or golf carts, such that other suspension components typically attached to the axle 123 may be eliminated or reduced.

As described above, the lubricant 118 may be delivered to the gap 116 (and also the cavity 131) through the axle 123 and stator 112. The stator 112 may include lubricant channels 120 therein that communicate with corresponding lubricant channels 120a in the axle 123. The lubricant 118 cycles through the system 100, where it drains from the gap 116 and cavity 131 through the outlet 125 in the axle 123 and returns to the pump 121. The pump 121 may include a known mechanism for pumping fluid, and the pump 121 may further include additional components for treating the lubricant 118, such as a thermal control mechanism 136 that may cool or heat the lubricant to a desired temperature to control viscosity. The thermal control mechanism 136 may include sensors 138 and a controller 140 for managing the lubricant temperature. The pump 121 may further include a filter mechanism that filters the lubricant 118 to remove impurities and the like. The pump 121 may include sensors associated with the filter mechanism to measure the status of the fluid and/or filter.

The above described system 100, providing wheel support on the electric motor 110, reduces the overall size of the wheel end system, such that the motor 110 does not need to placed beside the wheel hub to drive the wheel.

Figure 3:
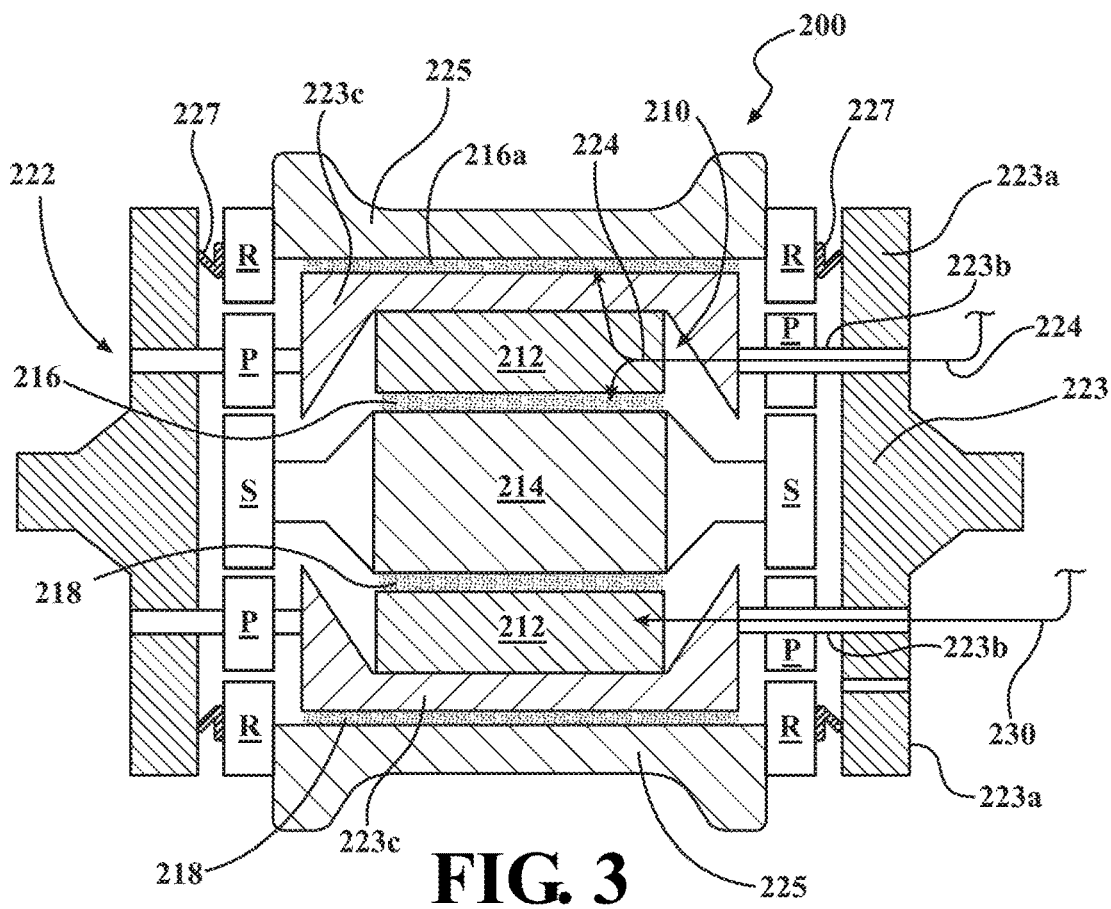
FIG. 3 is a cross-sectional view of another aspect of the lubricant supported electric motor illustrating a wheel end motor with a reduction mechanism and a wheel supported by a ring gear of the reduction mechanism.

With reference to FIG. 3, in another aspect, a system 200 includes a lubricant supported electric motor 210 having a stator 212 and a rotor 214. In this aspect, the rotor 214 is disposed within the stator 212, similar to the arrangement of the lubricant supported electric motor 10 shown in FIG. 1. However, unlike the lubricant supported motor 10 of FIG. 1, gear reduction and wheel support is provided by structure surrounding the rotor 214, which is further described below.

The lubricant supported electric motor 210 includes a gap or support chamber 216 disposed between radially between the rotor 214 and stator 212, with the gap 216 configured to receive lubricant 218 to support the rotor 214 within the stator 212. The lubricant 218 within the gap 216 may also drain out of the gap 216 and be cycled through the system 200 to a pump or the like (not shown in FIG. 3), similar to the pump 121 of the system 100.

The lubricant supported electric motor 210 further includes a gear reduction mechanism 222. The gear reduction mechanism 222 may be in the form of a planetary gear reduction mechanism, in which a number of circumferentially fixed planet gears P are disposed around a rotatable sun gear S, which rotates the planet gears P about their individual axes, causing a ring gear R that surrounds the planet gears P to rotate at a different rotational velocity than the sun gear S.

The planet gears P are attached to a planet carrier 223, which may be fixedly attached to a vehicle chassis. The planet carrier 223 may be considered a replacement for an axle type structure, or the chassis may include an axle portion that is fixed to the planet carrier 223. The planet carrier 223 remains in a generally fixed position relative to the axle/chassis of the vehicle. The planet carrier 223 may include a pair of outer body portions 223a that support a plurality of circumferentially arranged pins 223b. The pins 223b remain in a generally fixed position relative to the planet carrier 223, and the pins 223b support the planet gears P for rotation. Thus, each of the individual planet gears P may rotate about an axis defined by the pin 223b on which they are supported.

The planet carrier may further include an inner body portion 223c. The inner body portion 223c may have the same general axial location as the rotor 214 and stator 212, and the inner body portion 223c may have an annular shape that supports the pins 223b, similar to the outer body portion 223a. Thus, the pins 223b extend axially between the outer body portion 223a and the inner body portion 223c. The inner body portion 223c, along with the outer body portion 223a and the pins 223b, remains stationary during operation of the motor 210.

The stator 212 is mounted to or otherwise fixedly attached to the inner body portion 223c. The stator 212 may be integrally formed with the inner body portion 223c, or it may be separate component. The stator 212, including the windings and the like, may be disposed radially inward from the inner body portion 223c, such that the stator 212 is radially between the inner body portion 223c and the rotor 214. In an alternative approach, the stator 212 may be mounted or attached to the inner body portion 223c such that the inner body portion 223c is disposed radially between the stator 212 and the rotor 214. In this approach, the distance between the rotor 214 and the stator 212 is small enough that the current applied to the stator 212 will still effectively rotate the rotor 214.

The stator 212 and the planet carrier 223 thereby combine to define a fixed structure, with the rotor 214 disposed within this fixed assembled structure. The lubricant 218 may be delivered into the lubricant supported electric motor 210 and drained from the motor 210 via fluid channels 224 disposed in both the planet carrier 223 and the stator 212. The fluid channels 224 may extend through one or more of the pins 223b.

The reduction mechanism 222 includes the ring gear R previously described above. The ring gear R has a generally annular shape and circumferentially and radially surrounds the planet gears P. The ring gear R therefore has inner teeth that engage outer teeth of the planet gears P. The ring gear R may be in the form of axially outer portions that are disposed on opposite axial sides of the rotor 214 and stator 212. The ring gear R rotates in response to rotation of the planet gears P.

The ring gear R is fixedly attached to a wheel rim 225 that surrounds the inner body portion 223c, stator 212, and rotor 214. The wheel rim 225 will therefore rotate around the stationary stator 212 and inner body portion 223c of the planet carrier 223 in accordance with the rotation of the ring gear R. The ring gear R and wheel rim 225 will also rotate around the rotor 214, which is disposed at the radial center of the motor 210. The wheel rim 225 may support a tire attached thereto (not shown in FIG. 3), or the wheel rim 225 may include wheel structure configured to engage the ground in lieu of a separate tire.

As described above, the lubricant 218 is disposed in the gap 216 between the rotor 214 and the stator 212 or inner body portion 223c of the planet carrier 223 that supports the stator 212. As illustrated in FIG. 3, the lubricant 218 may also be disposed radially between the wheel rim 225 and the inner body portion 223c or the stator 212 (whichever is disposed radially adjacent the wheel rim 225) in an outer gap 216a. The lubricant 218 may be delivered to the outer gap 216a via the channel 224 extending through the stator 212 and the inner body portion 223c, or the lubricant 218 may reach the outer gap 216a by traveling through other fluid channels defined within the lubricant supported electric motor 210.

The system 200 may include a sealing portion 227 that extends between the outer portion 223a of the planet carrier 223 and the ring gear R, with the sealing portion 227 being fixed to either the outer body portion 223a or the ring gear R. The sealing portion 227 operates to seal the interior of the lubricant supported electric motor 210 and retain the lubricant 218 therein, such that the lubricant will be limited to exiting the lubricant supported electric motor 210 via a drain channel. The system 200 may also include wiring channels or passageways 230 extending through the pins 223b and the inner body portion 223c of the planet carrier 223 for receiving and routing wiring or the like to transfer current to the stator 212.

As described above, the rotor 214 is disposed within the stator 212 and is supported by the lubricant 218. The rotor 214 may therefore rotate relative to the stator 212 in response to providing the current to the stator 212. The rotor 214 is fixedly attached to the sun gears S, which have outer teeth configured to engage the outer teeth of the planet gears P. When the rotor 214 rotates, the sun gears S accordingly rotate along with the rotor 214. Rotation of the sun gears S causes a rotation of the planet gears P about their individual axes, which in turn cause a rotation of the ring gear R and the wheel rim 225.

Thus, the wheel rim 225 is directly supported by the reduction mechanism 222, in particular the ring gear R, and the reduction mechanism is directly supported by the lubricant supported electric motor 210 and attached to the lubricant supported electric motor 210. In particular, the stator 212 is supported by or supports the inner body portion 223c of the planet carrier 223. The system 200 can therefore provide integrated gear reduction, allowing for a smaller assembly, and eliminating additional connective components that would otherwise connect an electric motor with a reduction mechanism that is further attached to a wheel.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lubricant supported electric motor comprising:
a stator extending along an axis;
a rotor extending along the axis and rotatably disposed radially within the stator in spaced relationship to define at least one support chamber extending between the stator and rotor;
a lubricant disposed in the at least one support chamber for supporting the rotor within the stator;
a wheel rim disposed in radially surrounding relationship with the stator and the rotor;
a planet carrier interconnected to the stator and defining a plurality of pins disposed in circumferentially fixed relationship about the axis;
a planetary gear reduction mechanism operably interconnected to the rotor, the stator, and the wheel rim and configured to rotate the wheel rim in response to rotation of the rotor within the stator;
the planetary gear reduction mechanism including a sun gear disposed along the axis and interconnected to the rotor, a plurality of planet gears engaged with and circumferentially disposed around the sun gear and each rotatably supported by a respective one of the plurality of pins, and a ring gear engaged with and circumferentially disposed around the plurality of planet gears and interconnected to the wheel rim;
the stator defining at least one passageway disposed in fluid communication with the at least one support chamber;
the planet carrier defining at least one channel extending through the plurality of pins and disposed in fluid communication with the at least one passageway; and
a pump disposed in fluid communication with the at least one channel for pumping the lubricant serially through the at least one channel and the at least one passageway and into the at least one support chamber.

2. A lubricant supported electric motor as set forth in claim 1, wherein the planet carrier includes an inner body portion disposed within the wheel rim in axially aligned relationship with the rotor and the stator and an outer body portion disposed axially outside of and in spaced relationship with the inner body portion, and each of the plurality of pins extending between the inner and outer body portions.

3. A lubricant supported electric motor as set forth in claim 2, wherein the inner body portion is disposed radially between the stator and the wheel rim.

4. A lubricant supported electric motor as set forth in claim 2, wherein the outer body portion is fixedly attached to a vehicle chassis.

5. A lubricant supported electric motor as set forth in claim 2, further comprising a seal extending between the ring gear and the outer body portions of the planet carrier for retaining the lubricant within the support chamber.

6. A lubricant supported electric motor as set forth in claim 2, wherein the inner body portion of the planet carrier is disposed in spaced relationship with the wheel rim to define an outer gap, and the at least one passageway of the stator is disposed in fluid communication with the outer gap to deliver the lubricant to the outer gap in addition to the support chamber.

* * * * *